(12) United States Patent
Van Seventer et al.

(10) Patent No.: US 11,309,770 B2
(45) Date of Patent: Apr. 19, 2022

(54) IN-WHEEL ELECTRIC MOTOR PROVIDED WITH A COOLING SYSTEM

(71) Applicant: E-TRACTION EUROPE B.V., Apeldoorn (NL)

(72) Inventors: Timothy Van Seventer, Apeldoorn (NL); Reinhard Peter Van Der Wal, Apeldoorn (NL)

(73) Assignee: E-TRACTION EUROPE B.V., Apeldoorn (NL)

( * ) Notice: Subject to any disclaimer, the term of this patent is extended or adjusted under 35 U.S.C. 154(b) by 135 days.

(21) Appl. No.: 16/632,117

(22) PCT Filed: Jul. 20, 2018

(86) PCT No.: PCT/NL2018/050503
§ 371 (c)(1),
(2) Date: Jan. 17, 2020

(87) PCT Pub. No.: WO2019/017787
PCT Pub. Date: Jan. 24, 2019

(65) Prior Publication Data
US 2020/0177054 A1    Jun. 4, 2020

(30) Foreign Application Priority Data

Jul. 20, 2017   (NL) ..................................... 2019302

(51) Int. Cl.
*H02K 9/19*       (2006.01)
*H02K 11/33*      (2016.01)
(Continued)

(52) U.S. Cl.
CPC .................. *H02K 9/19* (2013.01); *H02K 1/20* (2013.01); *H02K 5/20* (2013.01); *H02K 9/00* (2013.01);
(Continued)

(58) Field of Classification Search
CPC .......... H02K 5/20; H02K 15/14; H02K 11/33; H02K 9/19; H02K 1/20; H02K 1/2786;
(Continued)

(56) References Cited

U.S. PATENT DOCUMENTS

2005/0104470 A1*  5/2005  Perkins ................ H02K 21/222
                                                          310/254.1
2017/0110933 A1   4/2017  Michel
(Continued)

FOREIGN PATENT DOCUMENTS

EP         1252034 A1    10/2002
EP         1713169 A1    10/2006
(Continued)

OTHER PUBLICATIONS

Schulze et al, Drive Unit for a Vehicle Wheel, Feb. 16, 2012, WO 2012019690 (English Machine Translation) (Year: 2012).*
(Continued)

*Primary Examiner* — Quyen P Leung
*Assistant Examiner* — Alexander A Singh
(74) *Attorney, Agent, or Firm* — Nixon & Vanderhye

(57) ABSTRACT

An in-wheel electric motor includes at a vehicle side an elongated connector, a cylindrical stator body connected to the connector and on an outer surface of the stator body equipped with stator windings, a cylindrical rotor body enclosing the stator, and a power electronics device powering the stator windings. The connector is provided with a first opening of a feed channel for coolant and a second opening of a return channel for coolant, each of the feed and return channels being parallel to an axial direction of the connector. The electric motor includes a cooling circuitry with a feed connector and a return connector for coolant, which circuitry includes a coolant supply channel that extends from the feed connector through first the power
(Continued)

electronics device and subsequently through a cooling jacket that is situated at the perimeter of the cylindrical stator body and from there to the return connector.

17 Claims, 6 Drawing Sheets

(51) Int. Cl.
  *H02K 1/20* (2006.01)
  *H02K 5/20* (2006.01)
  *H02K 15/14* (2006.01)
  *H02K 9/00* (2006.01)
  *H02K 9/197* (2006.01)

(52) U.S. Cl.
  CPC ............ *H02K 9/197* (2013.01); *H02K 11/33* (2016.01); *H02K 15/14* (2013.01)

(58) Field of Classification Search
  CPC .......... H02K 1/187; H02K 11/30; H02K 9/00; H02K 9/04; H02K 9/06; H02K 9/08; H02K 9/10; H02K 9/12; H02K 9/14; H02K 9/16; H02K 9/193; H02K 9/197; Y02T 10/64
  USPC ........... 310/68 R, 52, 53, 54, 56, 57, 58, 59, 310/60 R, 60 A
  See application file for complete search history.

(56) References Cited

U.S. PATENT DOCUMENTS

2018/0331601 A1* 11/2018 Zhou .................... B60K 11/06
2019/0229583 A1*  7/2019 Dextraze ............... H02K 1/187

FOREIGN PATENT DOCUMENTS

| WO | 01/54939 A2 | 8/2001 | |
|---|---|---|---|
| WO | WO-2012019690 A2 * | 2/2012 | ............ H02K 7/006 |
| WO | 2013/025096 A1 | 2/2013 | |

OTHER PUBLICATIONS

International Search Report, dated Nov. 22, 2018, from corresponding PCT application No. PCT/NL2018/050503.

* cited by examiner

IN-WHEEL ELECTRIC MOTOR PROVIDED WITH A COOLING SYSTEM

FIELD OF THE INVENTION

The present invention relates to an in-wheel electric motor provided with a cooling system. Also, the invention relates to method of manufacturing such an in-wheel electric motor. Furthermore, the invention relates to a drive assembly for a wheel of a vehicle comprising such an electric motor.

BACKGROUND OF THE INVENTION

US 2017-0110933 describes a traction/braking device for an electric wheel motor comprising a stator assembly, a rotor, a braking system with brake disc rotating as one with the rotor, the stator assembly comprising a stub axle support, a stator body and a cover delimiting a stator cooling chamber, the stub axle support comprising a securing base intended for connecting the traction/braking device to the vehicle. The stub axle support comprises three axial passages for two fluid pipes and one for the passage of cables, these three passages opening into a central zone of the securing base.

The stub axle support is fixed to the stator body and extends through the interior of the stator body from a vehicle side of the motor to a road side of the motor, so that the hollow space at the inner circumferential surface of the stator body is substantially completely filled by the stub axle support. No control electronics for providing power to the in-wheel motor are provided within the stator body. Instead, a plurality of coils that are attached to the stator are controlled by a computer which is housed outside the wheel and which is intended to control the torque generated by the electric motor formed by the stator and rotor assembly.

An in-wheel electric motor in which control electronics are arranged within the stator is known from WO 2013/025096. This document describes an electric vehicle with an in-wheel electric motor in which the rotor is coupled to a rim of the wheel carrying one or more tyres. The stator is mounted on the frame of the vehicle via a wheel suspension system. The known in-wheel motor is part of a direct drive wheel in which the electromagnets of the motor directly drive the rim and the tyre without any intermediate gears. In this manner, weight and space are saved and the number of components in the drive assembly is minimized.

The torque that is generated by the in-wheel motor depends on the flux-carrying surface between the rotor and the stator and is a quadratic function of the rotor radius. The rotor magnets are placed as far outwardly as possible around the stator, to obtain a largest possible rotor radius and the motor design is optimised to minimize the gap between the rotor and the stator for delivering a maximum power and torque to the tyre. The gap width between rotor and stator is on the other hand designed to be large enough to absorb mechanical impacts on the wheel during driving conditions.

The windings of the stator are powered by power electronics that are situated within the stator, which power electronics convert electrical energy from a power supply system of the vehicle, e.g. a battery pack and/or an electric generator, to an AC current that is suitable for use by the electric motor. Such power electronics typically comprise power electronics, e.g. IGBT (Insulated-gate bipolar transistor) current modules and a current regulator, such as described in EP 1 252 034. By using the power electronics to control the current and/or voltage supplied to the windings of the stator, the magnetic field vector of the flux generated by the stator is controlled and the electric motor is operated at the desired torque and/or speed of rotation. By integrating the power electronics within the stator, the length of bus bars which run from the power electronics to the electromagnets can remain short, which is highly desirable in view of minimizing losses of the high electrical currents and voltages generally required for operating such an electric motor, which may for instance amount to 300 A at 700V or more.

The in-wheel drive assembly can be embodied as a substantially self-contained module, without any moving parts of the vehicle attached to and/or extending into the rotor. The interior space defined by the rotor is preferably substantially closed off to prevent ingress of foreign particles, such as dust and/or wear particles released by a brake system of the vehicle and/or by the road, into said interior.

The in-wheel drive assembly may be mounted on the vehicle in a variety of positions by connecting the vehicle side of the drive assembly to the vehicle frame. A rim for mounting a tire may be attached to the rotor, preferably to a substantially cylindrical outer surface of the rotor.

In order to cool the electric motor and/or the power electronics, the known drive assembly is provided with a cooling system having a meandering cooling channel that is situated on a cylindrical shell close to an inner surface of the stator windings. Liquid coolant flows through the cooling channel into and out of the drive assembly. Additionally, the cylindrical shell of the cooling system has a circular end surface on which the power electronics are mounted. The meandering cooling channels extend along the cylindrical surface and at halfway pass through the circular end surface.

However, in the prior art in-wheel electric motor effective cooling of the power electronics is hindered, which causes during use the power electronics to heat to comparatively high temperatures and limits the power that can be supplied to the stator windings. Cooling by the meandering cooling channel is not efficient.

It is an object of the present invention to overcome or mitigate one or more of the disadvantages from the prior art. It is in particular an object of the present invention to provide an in-wheel electric motor with effectively cooled power electronics that can be easily assembled and disassembled.

SUMMARY OF THE INVENTION

The object is achieved by an in-wheel electric motor comprising: a stator with at a vehicle side a connector stub; a cylindrical hollow stator body connected to the connector stub and on an outer surface equipped with stator windings; a cylindrical rotor body coaxially enclosing the stator, and rotatable around an electric motor rotation axis; a cooling jacket that is situated at the perimeter of the cylindrical hollow stator body and arranged for cooling the stator windings; a power electronics device arranged within the hollow stator body and adapted for powering the stator windings; wherein the connector stub is provided with a first opening of a feed channel for liquid coolant and a second opening of a return channel for liquid coolant, each of the feed and return channels being substantially parallel to the axial direction of the connector stub; wherein the electric motor comprises an internal cooling circuitry with a feed connector and a return connector for liquid coolant, with the feed connector arranged for liquid tight coupling to the first opening of the feed channel and the return connector arranged for liquid tight coupling to the second opening of the return channel, and wherein the internal cooling circuitry comprises a coolant supply channel that extends from the feed connector through first the power electronics device and subsequently a cooling jacket within the cylindrical hollow stator body to the return connector.

Preferably, the feed connector is arranged on an inlet of the coolant supply channel into the power electronics device, and the return connector is arranged on an outlet of the coolant supply channel from the cooling jacket. According to the invention, liquid coolant enters, after passing a cooling unit or heat exchanger on the vehicle, into the in-wheel motor and first comes into heat exchanging contact with the electronic components of the power electronics device, before passing through the cooling channels of the stator body. In this manner, the electronic components which may reach higher temperatures during operation than the stator windings, are cooled by relatively cold liquid coolant which provides a relatively high heat transfer, in comparison with the cooling circuitry from the prior art, where the electronic components are cooled by the liquid coolant that is used for cooling of the stator windings. The feed connector and return connector preferably allow axial coupling and decoupling when the power electronics device is slid parallel to the axis of rotation respectively towards and away from the connector member.

In an embodiment, the internal cooling channel comprises a first loop which runs from the feed connector, through the power electronics device and back to the return connector, wherein the first loop is arranged completely upstream from the cooling jacket. Cooling liquid may thus stream from the connector member through the power electronics device towards the road side end and then back towards the connector member, in this manner forming the first loop.

In an embodiment the internal cooling channel comprises a second loop arranged completely downstream from the first loop and connected thereto, wherein said second loop extends from the connector member, through the cooling jacket and back into the connector member. Cooling liquid which has passed through the first loop may thus subsequently stream from the connector member, through the cooling jacket towards the road side and the back towards the connector member, in this manner forming the second loop. Preferably the flange comprises a channel connected downstream of the return connector and which connects first loop to the second loop.

In an embodiment a first portion of the internal cooling circuitry comprises the feed channel, a second portion of the internal cooling circuitry comprises cooling ducts within the power control device, wherein the internal cooling circuitry further comprises channels in the cooling jacket, wherein the second portion is completely upstream from the channels in the cooling jacket and arranged radially within the volume spanned by said channels. The second portion is thus arranged upstream from the channels of the cooling jacket and on an inner side of the channels.

In an embodiment a volume spanned by the second portion is completely arranged within the volume spanned by the channels of the cooling jacket. Additionally or alternatively a volume spanned by the second loop is completely arranged within the volume spanned by the first loop. By spacing the second portion of the internal cooling circuitry apart from the channels of the cooling jacket in this manner, it may be ensured that the cooling liquid first cools the power electronics device and subsequently cools the electromagnets that are powered by the power electronics device.

In an embodiment the second portion forms a loop for the cooling liquid within the power electronics device, and/or the cooling jacket forms a loop for the cooling liquid. The second portion may thus form a first loop, and the channels of the cooling jacket may thus form a second loop downstream from the first loop.

In an embodiment the connector member comprises a flange which lies within the rotor, wherein the flange is provided with an inlet channel for the cooling jacket, wherein the inlet channel is arranged downstream from the return connector, and wherein the flange is provided with an outlet channel for cooling liquid from the cooling jacket. Cooling liquid that has passed through the power electronics device can thus be supplied through the inlet channel to the cooling jacket. After having circulated through the cooling jacket, it can leave the cooling jacket via the outlet channel. The outlet channel is typically connected to a cooling device, e.g. a radiator, outside of the in-wheel motor and within the vehicle.

In an embodiment the connector member comprises a flange which lies within the rotor, wherein the feed connector and the return connector extend substantially parallel to the axis of rotation and at least partially between the power electronic device and a side of the flange facing the power electronics device. During mounting of power electronics device within the hollow stator body, the power electronics device can be slid parallel to the axis of rotation towards the facing side of the flange in order to allow the feed connector and the return connectors to provide a fluid connection with flange and the power electronics device.

In an embodiment the coolant supply channel is in heat exchanging contact with electronic components of the power electronics device. For instance, the coolant supply channel may pass close to IGBT's and/or capacitors or other components of the power electronics which generate heat when the power electronics device converts AC power from the vehicle to power suitable for use by the in-wheel electric motor.

In an embodiment the coolant supply channel within the power electronics device is provided with one or more heat exchangers attached to one or more of the electronic components. Such heat exchangers for instance may comprise metal tubes which are with their outer surface attached to the electronic components, and wherein the cooling liquid flows within the tubes. Other well known types of heat exchangers that may be used when in thermal contact with both the coolant supply channel and the power electronics device comprise heat pipes and cooling fins.

In an embodiment, a first seal is arranged between the first opening of the feed channel and the feed connector, and a second seal is arranged between the second opening of the return channel and the return connector. The seals preferably are adapted to provide a liquid tight connection between the feed and return connectors on the one hand, and the power electronics and/or side of the flange facing the power electronics on the other hand. The seals typically are adapted to allow the feed and return connectors to be inserted therein along a direction parallel to the axis of rotation, e.g. during mounting of the power electronics device within the hollow stator body.

In an embodiment the feed connector and the return connector are arranged on the flange at a side facing the power electronics device; or the feed connector is arranged on the flange at a side facing the power electronics device and the return connector is arranged on the power electronics device at a side facing the flange; or the feed connector is arranged on the power electronics device at a side facing the flange and the return connector is arranged on the flange at a side facing the power electronics device; or the feed connector and the return connector are arranged on the power electronics device at a side facing the flange. In all of these cases, the feed and return connector can be slid into an opening—which is preferably provided with a seal—by sliding the power electronics device along the axis of rotation towards the flange.

In an embodiment an interconnecting duct is arranged between the coolant supply channel within the power electronics device and the coolant supply channel within the cooling jacket. Preferably, the interconnecting duct extends through the flange from the return connector to a circumferential edge of the flange where the flange is connected to the cooling jacket.

In an embodiment, the connector member comprises a flange which lies within the rotor and has a side facing the power electronics device, wherein the flange and/or inner circumferential surface of the hollow stator body is provided with one or more supports which extend parallel to the axis of rotation and are adapted for supporting the sliding movement of the power electronics device along the axis of rotation into and out of the hollow stator body. The supports facilitate positioning and sliding of the power electronics device into the hollow stator body. The supports may extend from the side of the flange facing the power electronics device and/or may comprise edges on the inner circumference of the hollow stator body, for supporting the power electronics device.

According to an aspect, the invention provides a method for assembling an in-wheel electric motor; the electric motor comprising a stator with at a vehicle side a connector stub, a cylindrical hollow stator body connected to the connector stub and on an outer surface equipped with stator windings, and further comprising a cylindrical rotor body coaxially enclosing the stator and rotatable around an electric motor rotation axis; the electric motor further comprising a power electronics device for powering the stator windings; wherein the connector member comprises a first opening of a feed channel for liquid coolant and a second opening of a return channel opening for liquid coolant, each of the feed and return channels being substantially parallel to the axial direction of the connector stub, wherein the method comprises providing a housing comprising control electronics, the housing having an outgoing cooling channel with a first male connector and a return cooling channel, with a second male connector situated near the first connector and sliding the first and second male connectors of the housing into the first and second openings.

The method preferably further comprises: providing within the in-wheel electric motor an internal cooling circuitry with a feed connector and a return connector for liquid coolant, with the feed connector arranged for liquid tight coupling to the first opening of the feed channel and the return connector arranged for liquid tight coupling to the second opening of the return channel, and connecting the power electronics device to the feed channel and providing a coolant supply channel in the cooling circuitry that extends from the feed connector through first the power electronics device and subsequently a cooling jacket within the cylindrical hollow stator body to the return connector.

Additionally, the invention relates to a drive assembly for a wheel of a vehicle either comprising an in-wheel electric motor as described above, or an in-wheel electric motor manufactured by a method as described above wherein the rotor part and the stator part are both adapted to be arranged at least partially within the wheel.

Advantageous embodiments are further defined by the dependent claims.

BRIEF DESCRIPTION OF DRAWINGS

The invention will be explained in more detail below with reference to drawings in which illustrative embodiments thereof are shown. The drawings are intended exclusively for illustrative purposes and not as a restriction of the inventive concept.

In the drawings.

DETAILED DESCRIPTION OF EMBODIMENTS

Figure 1A:
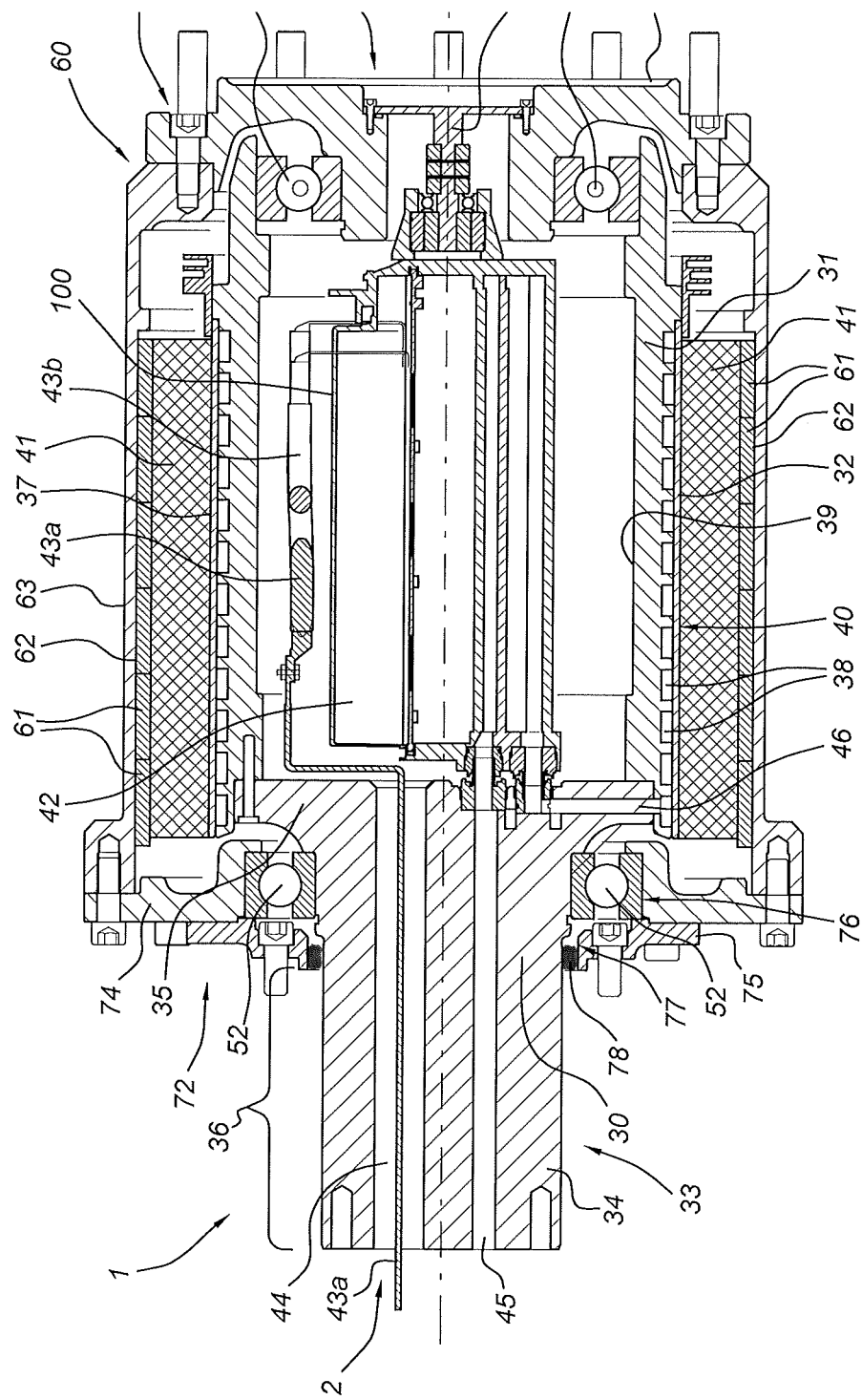
FIGS. 1A, 1B, 1C respectively show a cross-sectional view, a cut-away isometric view of a drive assembly and a cross-section of drive assembly for use with the present invention.

FIG. 1A shows a cross-sectional view of a drive assembly 1 for use with the present invention. The drive assembly comprises a stator 30 with a hollow stator body 31 which has an outer surface 32 around which a rotor 60 is arranged. The drive assembly further comprises a connector stub 33, arranged at a vehicle side 2 of the assembly 1 for attaching the drive assembly to an axle of the vehicle. The connector stub 33 is fixedly connected to the stator body 34 via a flange 35 which lies within the rotor 60 and has a larger diameter than a portion 36 of the stub 33 which lies outside the peripheral outer surface 63 of the rotor 60. For supporting rotational movement of the rotor 60 around the axis of rotation R, vehicle side bearings 52 are provided via which the rotor supported on the stub 33 on the vehicle side. On the road side 3, the rotor is rotatingly supported on the stator body 31 via road side bearings 54.

A plurality of permanent magnets 61 is attached on an inner circumferential surface 62 of the rotor 60 and can rotate around electromagnets 41 of the stator 30. The electromagnets 41 are fixed on the stator body 31 and drive rotation of the rotor by interaction between the permanent magnets 61 and the magnetic flux generated by the electromagnets 41. The stator 30 and rotor 60 form an electric motor adapted for directly driving rotation of a wheel around axis of rotation R.

The rotor 60 comprises a substantially cylindrical rotor body 71 which has transverse ends 72, 73 respectively at its vehicle side 2 and at its road side 3. Both transverse ends 72, 73 are substantially closed off in order to prevent foreign particles, such as dust and wear particles from the road or released by a braking system of the vehicle, from entering the interior of the hollow rotor 60. The vehicle side of the rotor is substantially closed off by a side plate 74 which extends transversely to the axis of rotation R and by a cover plate 75. The side plate 74 and cover plate 75 are each provided with an opening through which the portion 34 of the connector stub 33 extends. The side plate 74 supports the vehicle side bearings 52 while the cover plate 75 is attached to the side plate 74 to cover the bearings 51 at their transverse vehicle side 2 and comprises an opening 77 through which portion 34 extends. The cover plate 75, together with a shaft seal 78 which is arranged between the inner circumferential edge 79 of the opening 77 and the outer circumference of the shaft 34, prevents foreign particles from damaging the vehicle side bearings 52. Additionally, the cover plate 75 and shaft seal 78 substantially prevent such particles from entering the interior 5 of the rotor from the vehicle side 2, where the particles could interfere with the electromagnets 41.

The road side bearings 54, which are arranged at an inner side of the stator body 31, are covered on the road side 3 by a detachable second cover plate 80. A resolver 81 rotationally connects the stator 30 to the second side plate 80 and is adapted for detecting an angular position of the rotor 60 relative to the stator 30. A circular opening is provided in the second cover plate 80, in which the resolver 81 is attached to the second cover plate 80 for the rotational connection to the rotor part.

For controlling and powering the electromagnets 41, a housing or casing 100 holding power electronics 42 is arranged within the hollow stator body 31. The power electronics 42 comprise components, such as IGBT's, for converting electrical energy from a power supply system of the vehicle, e.g. a battery pack and/or an electric generator, to an AC form suitable for use by the electric motor. A resolver 81 provides an angular position signal indicative of an angular position of the rotor to the power electronics so that the alternating current is supplied in phase with the magnetic field of the rotor.

Power supply lines 43a, 43b for supplying power to the power electronics 42 run from the exterior of the rotor 60, through passage 44, comprising a through hole, in the connector stub 33, to the power electronics.

The housing or casing 100 of the power electronics 42 is mounted on the head i.e., the flange 35 of the connector stub 33. The diameter of the opening 90 in the cylindrical rotor body 71 at the road side is larger than the cross-section of the casing of the power electronics 42. The detachable second cover plate 80 that closes off the opening in the cylindrical rotor body 71 at the road side allows that the power electronics 42 can be mounted by inserting the casing through the opening in the cylindrical rotor body 71 at the road side 3. Also, the detachable second cover plate 80 allows to lock the casing of the power electronics device in place and also to relatively easy access the power electronics 42, when needed.

To prevent overheating of the power electronics when the electric motor is in operation, a cooling system is provided comprising a cooling pump (not shown) and cooling circuitry that comprises a coolant supply channel 45 that runs from the cooling pump through a feed channel 45A in the connector stub 33, through a channel 45B, 45C, 45D in the power electronics device 42, then through a cooling jacket 37 provided on the outer surface 32 of the stator body 30 and finally through a return channel 45E in the connector stub 33 back to the cooling pump.

The feed channel and the return channel run through respective through holes in the connector stub 33 towards an outlet and inlet respectively, of a heat exchanger or cooling unit (not shown) within the vehicle. Further, the cooling circuitry typically comprises in the coolant supply channel 45 a circulation pump (not shown) for creating a stream of liquid coolant to flow through the coolant supply channel 45.

The cooling circuitry is configured to have the stream of liquid coolant first pass through the casing of the power electronics device 42 for cooling the electronic components of the power electronics device with a return conduit arranged in a floor plate of the casing. The return conduit enters into the connector stub where it is connected to a conduit that connects to the cooling jacket 37, so as to let the stream of liquid coolant pass through the cooling jacket 37 on the outer surface of the stator body, return to the return channel and finally pass through the return channel to the circulation pump.

Advantageously, the arrangement of the coolant supply channel with a lay-out of the cooling ducts as described above provides cooling of the hottest internal parts first by the coldest coolant fluid. After cooling electronic components of the power electronics device 42, the coolant fluid flows through the peripheral cooling channels for cooling the electromagnets.

The casing 100 of the power electronics 42 within the interior of the stator body 32 is provided with one or more internal cooling ducts 45B, 45C (see FIG. 3) that are in thermal contact with electronic components of the power electronics device. Coolant is supplied to an inlet conduit 45A (see FIG. 3) of the internal cooling ducts via the coolant supply channel 45. An outlet of the internal cooling ducts 45B, 45C is connected to an inlet of the cooling jacket 37 by means of an interconnecting cooling duct 45D. In an embodiment, the internal cooling ducts are located in a floor of the casing 100. On the floor the electronic components with relatively high dissipation are located to obtain sufficient cooling of these electronic components.

After passing the power electronics 42, the coolant fluid flows to the cooling jacket 37 which is provided on the outer surface 32 of the stator body 30. The cooling jacket 37 is provided with channels 38 which form a circuit that runs along the hollow cylindrical body 31 and provides a passage through which liquid coolant flows to cool the electromagnets 41 (or stator windings) that are arranged at an outer side 40 of the cooling jacket 37. An outlet of the cooling jacket 37 is connected to the return channel opening in the connector stub 33.

Relatively cold coolant can thus be supplied through the coolant supply channel 45 with the coolant warming up during its passage through the cooling ducts and absorbing heat from the power electronics 42, and subsequently passing through channels 38 to absorb heat from the electromagnets 41 before being returning to the pump within the chassis of the vehicle. The warmed-up coolant is preferably cooled in the heat exchanger/cooling unit on the vehicle, after which it is recirculated through the coolant supply channel 45A-45E (see FIG. 3).

As will be described in more detail with reference to FIG. 2, the casing of the power electronics and the connector stub 33 are arranged with a plugs and sockets arrangement for connecting the power electronics mechanically, electrically and thermally for mounting, power supply and cooling, respectively.

Figure 1B:
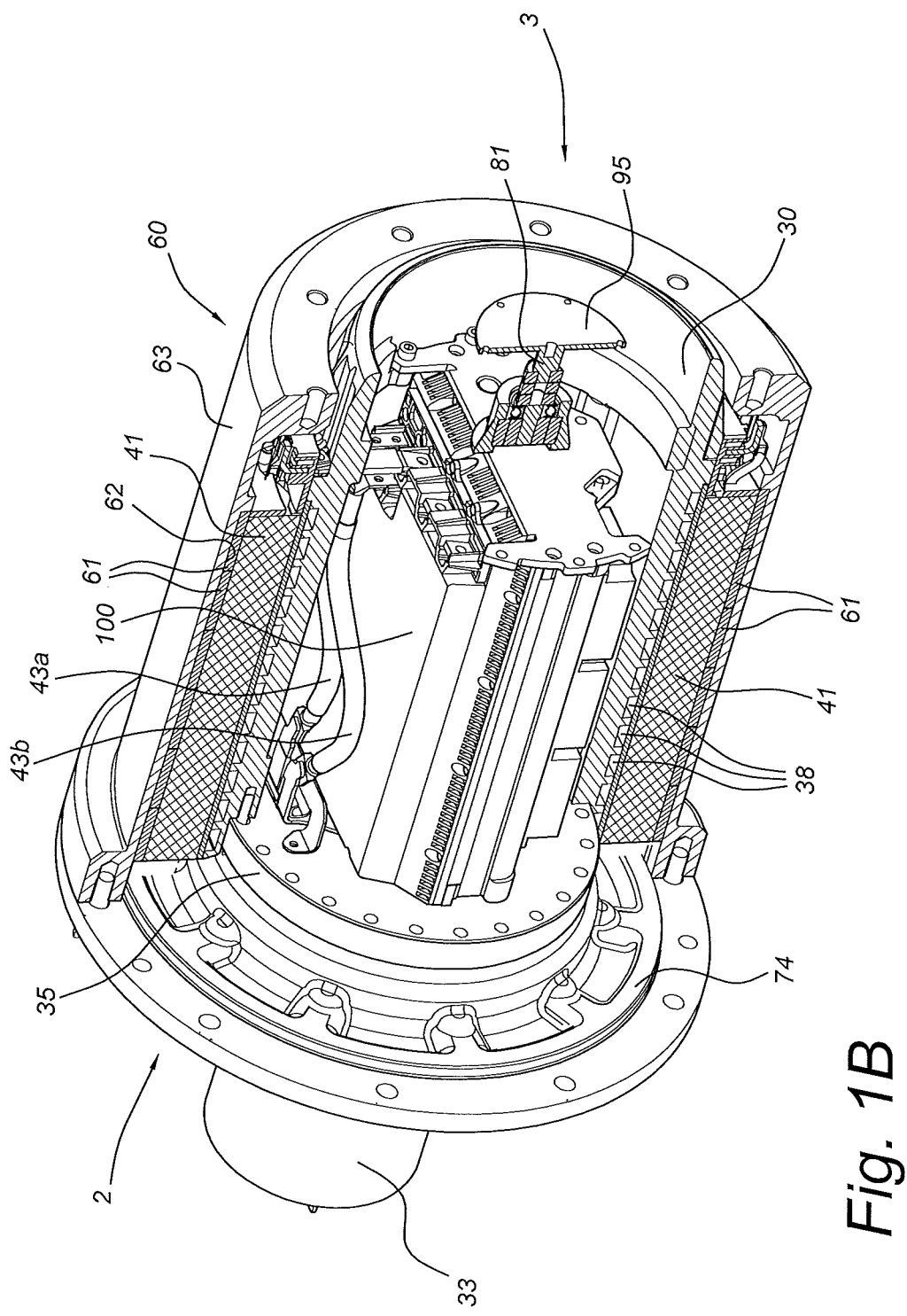

FIG. 1B shows a partially cut-away isometric view of the drive assembly of FIG. 1A, in which the second cover plate 80 and the road side bearings 54 however are not shown to allow a better view of the hollow stator body 31 and the resolver 81.

Figure 1C:
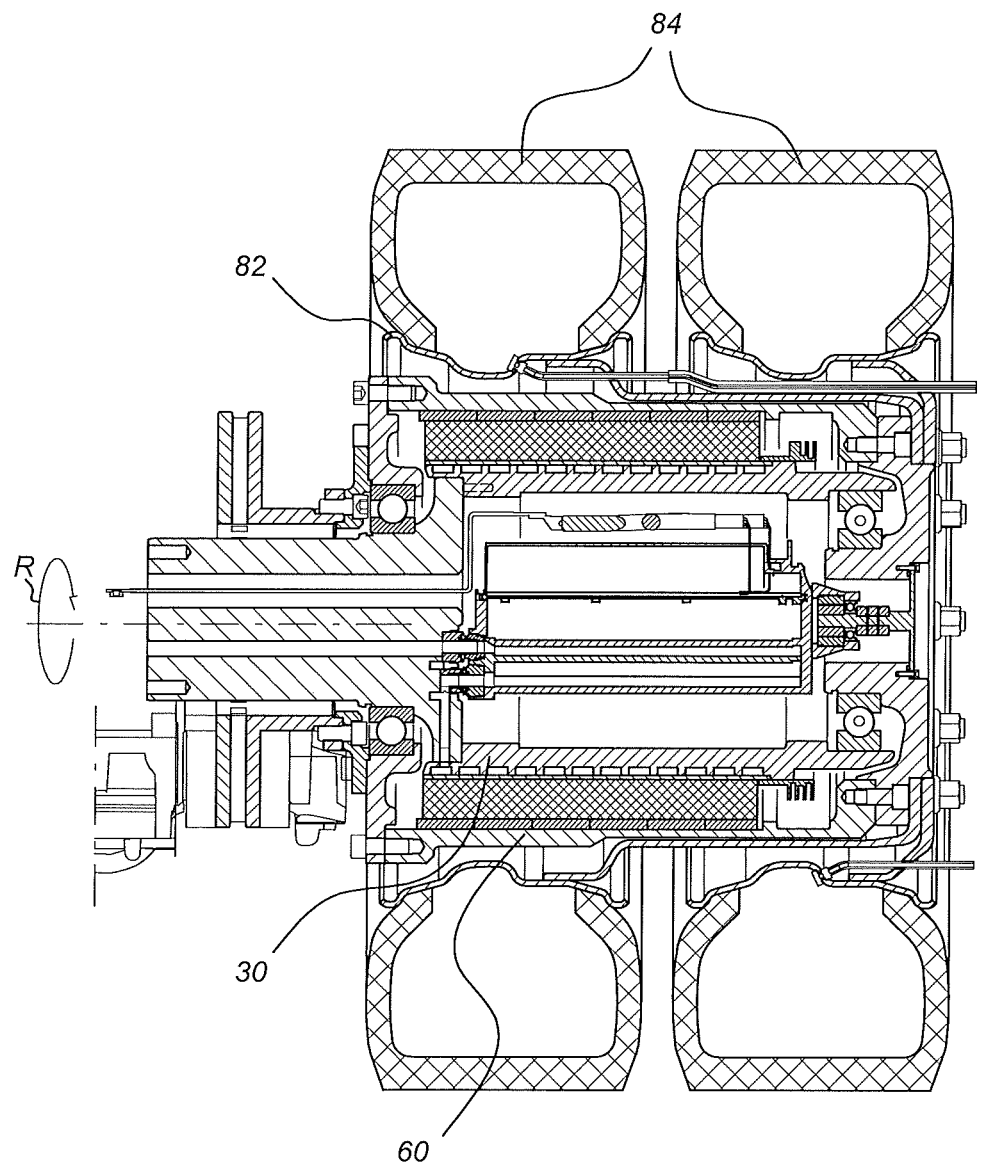

FIG. 1C shows a cross-section of a wheel drive assembly for use with the present invention. The wheel drive assembly comprises an in-wheel electric motor 4, a rim 82, and one or more tyres 84.

The in-wheel electric motor 4 comprises the stator part 60 and the rotor part 30. The stator part 60 is coupled to the connector stub 33 which is part of the chassis of a vehicle.

The rim 82 is arranged at the outer circumference of the rotor part 60. The rim 82 can be attached to the rotor part by a bolted connection as known in the prior art.

On the rim 82, one or more tyres 84 are mounted. The rotor part 60 and the stator part 30 are both arranged at least partially within the wheel.

Figure 2:
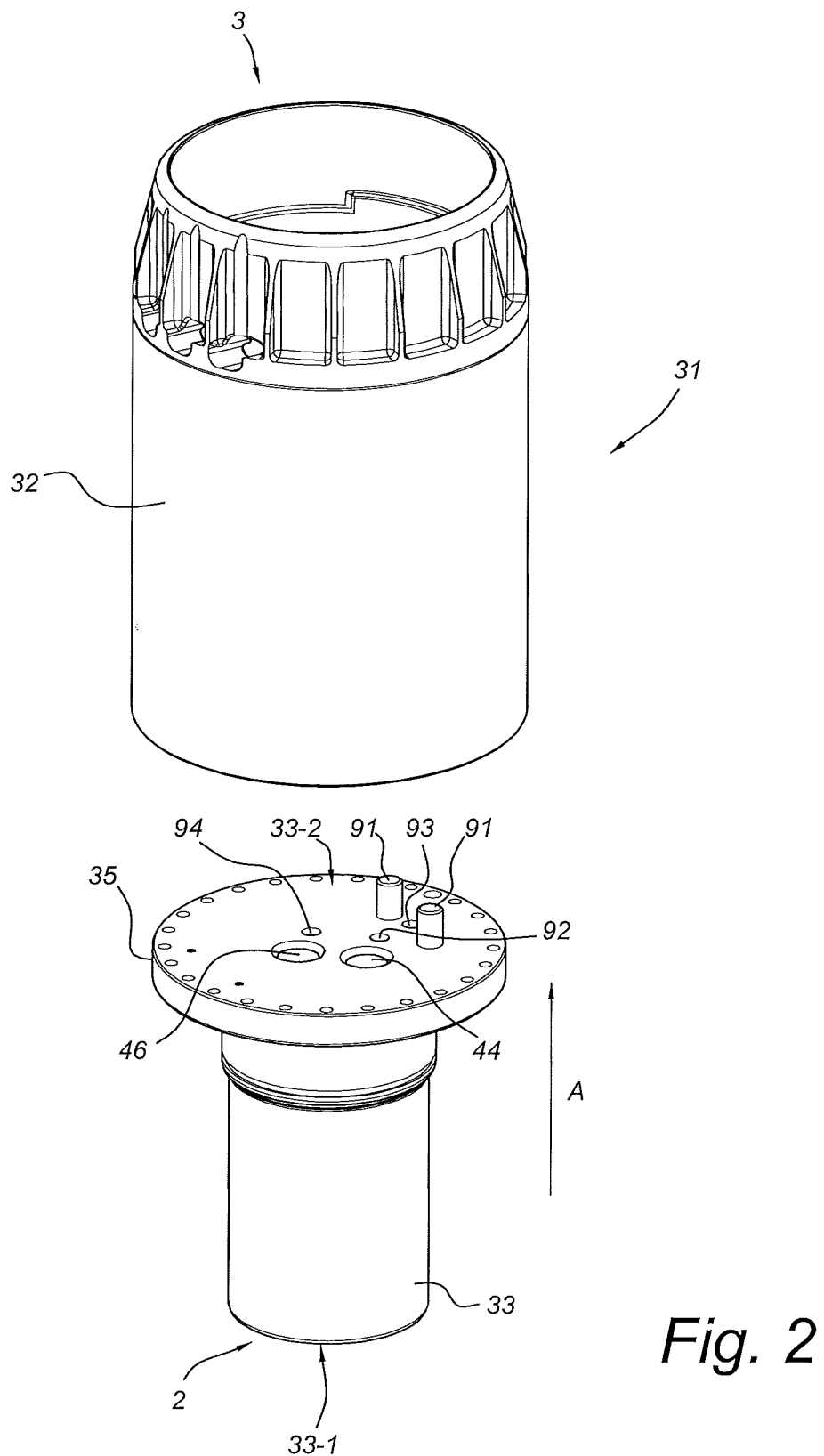
FIG. 2 shows a detailed view of a connector stub in accordance with an embodiment of the invention.

FIG. 2 shows an exploded view of the connector stub 33, having a first side 33-1 to be mounted facing a vehicle, and having a second side 33-2 substantially normal to the axis of rotation R and facing the opening defined by the hollow stator body 31. When assembled, the hollow stator body is fixed against the circumferential edge of the flange 35, with an inlet channel (not shown) for cooling liquid for the cooling jacket 37 and an outlet channel for the cooling liquid from the cooling jacket extending through the connector stub 33 and flange 35 thereof to the connector jacket. Cooling liquid can thus flow from the vehicle, via the flange 35 into channels 38 of the connection jacket 37, and, after having cooled the electromagnets 41, can flow back again to the vehicle via the flange 35 and subsequently through the stub 33. As it is important to properly cool the power electronics device 42, liquid coolant from the vehicle is circulated through the power electronics device before the liquid enters the channels 38 of the cooling jacket. The cooling channels 38 of the cooling jacket are arranged completely downstream from the cooling channels within the power electronics device, and the cooling jacket substantially radially surround the power electronics device.

In order to easily mount the power electronics device within the hollow stator body, the flange is provided at its second side 33-2 with two supports 91 which project parallel to the axis of rotation R and are provided for at least partially supporting thereon the power electronics device 42. The two supports 91 also ensure that the power electronics device, when it is mounted against second side 33-2 of the flange, is rotationally aligned around the axis of rotation, such that connectors of the power electronics device 42 can be axially inserted into corresponding openings provided on the second side 33-2 of the flange. Though not shown, further supports may be provided on the inner side of the hollow stator body, in the form of edges or ridges with extend along the inner surface in parallel to the axis of rotation and which are arranged for supporting the power electronics device thereon.

Figure 3:
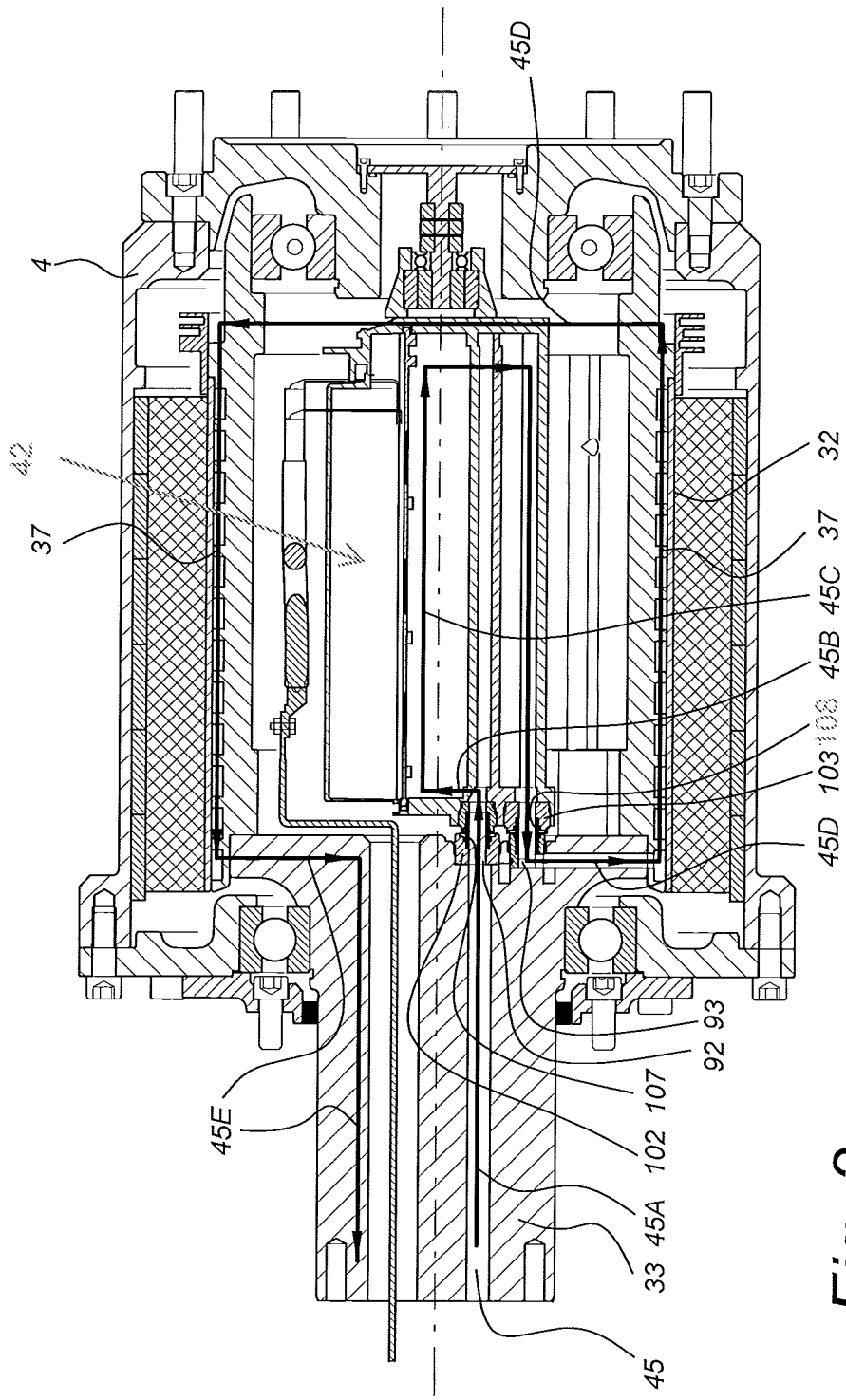
FIG. 3 shows a schematic layout of the cooling circuitry according to an embodiment of the invention.

FIG. 3 shows schematically a layout of a cooling circuitry in accordance with an embodiment of the invention, in which the flow of cooling liquid through the connector stub 33, the power control device 42 and subsequently through the cooling jacket 37 is schematically indicated.

Within the motor assembly, the cooling circuitry is arranged with a coolant supply channel that runs through a feed channel 45A in the connector stub 33, through a channel 45B, 45C in the power electronics device 42 along the electronic components if the power electronics device, then through a return channel 45D in the floor of the power electronics device to a further channel 45D in the connector stub 33 and then into the cooling jacket 37 provided on the outer surface 32 of the stator body 30. From the cooling jacket 37 a second return channel 45E runs through the connector stub 33.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims.

Figure 4:
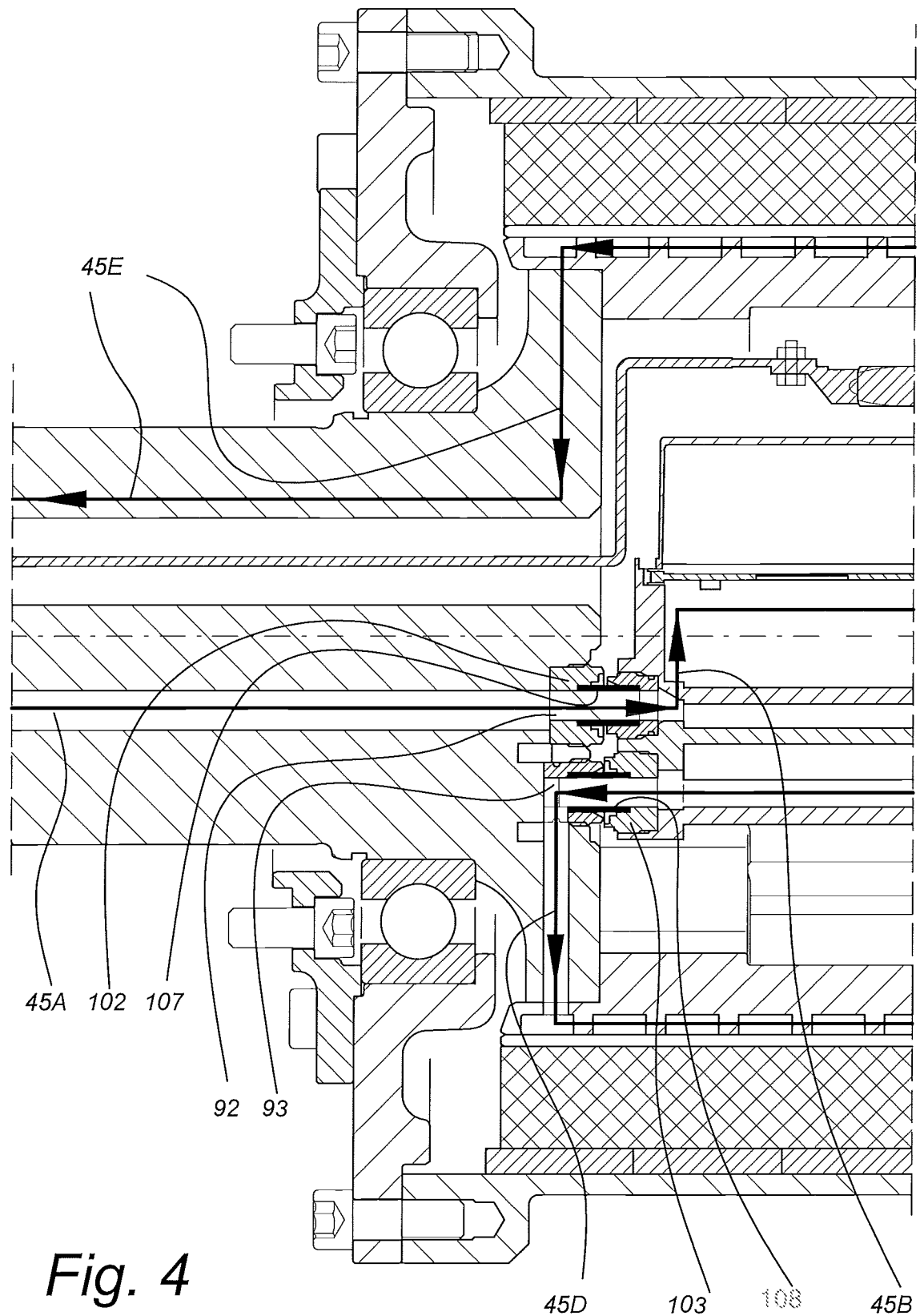
FIG. 4 shows a detail of FIG. 3.

FIG. 4 shows a portion of the cross-sectional view of FIG. 3 with the feed connector 102, the return connector 103 and the seals 107, 108 in greater detail. The feed connector and return connector are provided on the casing 100 at a side facing the openings of the feed and return channels 92, 93, so that the feed connector and return connector can be inserted into and removed from the openings by sliding the casing 100 with power electronics 42 axially along the axis of rotation R towards and away from the flange 35. The openings of the feed and return channel 92, 93 are provided with seals 107, 108 which surround the respective connectors 102, 103 when the connectors are inserted into the openings. The connectors and seals together thus provide a liquid tight coupling between the cooling channels within the casing for the power control electronics and the flange 35 of the stator.

FIG. 4 shows the coolant connectors of the casing of the power electronics device 42 mounted on the flange 35 of the connector stub 33. In this cross-section the respective connections between the feed channel and the feed fluid connector and between the return channel and the return fluid connectors are shown. Also, one of the terminals 43a is shown within the corresponding through hole in the connector stub 33. The connection between the feed channel and the feed fluid connector, and between the return channel and the return fluid connectors are each provided with a seal 107, 108 to be leak-proof.

In an embodiment, the openings of the feed channel 92 and the return channel 93 are provided with seals 107, 108 and check valves (not shown). Advantageously, a check valve will close the coolant circuitry at the vehicle side 2 in case of an open connection at the flange 35 of the connector stub 33 when the power electronics device 42 is removed from the flange of the connector stub 33.

The invention claimed is:

1. An in-wheel electric motor (4) for a vehicle, the in-wheel electric motor (4) comprising:
   a stator (30) with at a vehicle side (2) an elongated connector member (33), a cylindrical hollow stator body (31) connected to the elongated connector member (33) with a central axis (R) and on an outer surface of the cylindrical hollow stator body (31) equipped with stator windings;
   a cylindrical rotor body (60) coaxially enclosing the stator (30) and rotatable around the in-wheel electric motor (4) rotation axis;
   a cooling jacket (37) that is situated at the perimeter of the cylindrical hollow stator body (31) and arranged for cooling the stator windings;
   a power electronics device arranged within the cylindrical hollow stator body (31) and adapted for powering the stator windings;
   wherein the elongated connector member (33) is provided with a first opening of a feed channel (92) for liquid coolant and a second opening of a return channel (93) for liquid coolant, each of the feed and return channels being substantially parallel to an axial direction (A) of the elongated connector member (33);
   wherein the in-wheel electric motor (4) comprises an internal cooling circuitry with a feed connector (102) and a return connector (103) for liquid coolant, with the feed connector arranged for liquid tight coupling to the first opening of the feed channel (92) and the return connector arranged for liquid tight coupling to the second opening of the return channel (93), and
   wherein the internal cooling circuitry comprises a coolant supply channel (45B, 45C, 45D) that extends from the feed connector (102) through first the power electronics device (42) and subsequently to the cooling jacket (37),
   wherein the feed connector (102) is arranged on an inlet of the coolant supply channel (45B, 45C, 45D) into the power electronics device, and the return connector (103) is arranged on an outlet of the coolant supply channel (45B, 45C, 45D) from the power electronics device.

2. The in-wheel electric motor (4) according to claim 1, wherein the internal cooling circuitry comprises a first loop (45B, 45C) which runs from the feed connector (102), through the power electronics device and back to the return connector (103), wherein the first loop (45B, 45C) is arranged completely upstream from the cooling jacket (37).

3. The in-wheel electric motor (4) according to claim 1, wherein the internal cooling circuitry comprises a second loop arranged (45D, 45E) completely downstream from a first loop and connected thereto, wherein said second loop (45D, 45E) extends from the elongated connector member (33), through the cooling jacket (37) and back into the connector member.

4. The in-wheel electric motor (4) according to claim 1, wherein a first portion (45A) of the internal cooling circuitry comprises the feed channel (92), a second portion (45B, 45C) of the internal cooling circuitry comprises cooling ducts (45B, 45C) within the power electronics device, the internal cooling circuitry further comprises channels (38) in the cooling jacket (37), wherein the second portion (45B, 45C) is completely upstream from the channels (38) in the cooling jacket (37) and arranged radially within the volume spanned by said channels (38).

5. The in-wheel electric motor (4) according to claim 4, wherein a volume spanned by the second portion (45B, 45C) is completely arranged within the volume spanned by the channels (38) of the cooling jacket (37).

6. The in-wheel electric motor (4) according to claim 5, wherein the second portion (45B, 45C) forms a loop for the cooling liquid within the power electronics device, and/or wherein the cooling jacket (37) forms a loop for the cooling liquid.

7. The in-wheel electric motor (4) according to claim 4, wherein the second portion (45B, 45C) forms a loop for the cooling liquid within the power electronics device, and/or wherein the cooling jacket (37) forms a loop for the cooling liquid.

8. The in-wheel electric motor (4) according to claim 1, wherein the elongated connector member (33) comprises a flange (35) which lies within the cylindrical rotor body (60), wherein the flange (35) is provided with an inlet channel for the cooling jacket (37), wherein the inlet channel is arranged downstream from the return connector (103), and wherein the flange (35) is provided with an outlet channel for cooling liquid from the cooling jacket (37).

9. The in-wheel electric motor (4) according to claim 1, wherein the elongated connector member (33) comprises a flange (35) which lies within the cylindrical rotor body (60), wherein the feed connector (102) and the return connector (103) extend substantially parallel to the axis of rotation and at least partially between the power electronics device and a side (33-2) of the flange (35) facing the power electronics device.

10. The in-wheel electric motor (4) according to claim 1, wherein the coolant supply channel (45B, 45C, 45D) is in heat exchanging contact with electronic components of the power electronics device.

11. The in-wheel electric motor (4) according to claim 10, wherein the coolant supply channel (45B, 45C, 45D) within the power electronics device is provided with one or more heat exchangers attached to one or more of the electronic components.

12. The in-wheel electric motor (4) according to claim 1, wherein a first seal (107) is arranged between the first opening of the feed channel (92) and the feed connector (102), and a second seal (108) is arranged between the second opening of the return channel (93) and the return connector (103).

13. The in-wheel electric motor (4) according to claim 1, wherein
the feed connector (102) and the return connector (103) are arranged on the flange (35) at a side facing the power electronics device;
the feed connector (102) is arranged on the flange (35) at a side facing the power electronics device and the return connector is arranged on the power electronics device at a side facing the flange;
the feed connector is arranged on the power electronics device at a side facing the flange (35) and the return connector (103) is arranged on the flange (35) at a side facing the power electronics device; or
the feed connector (102) and the return connector (103) are arranged on the power electronics device at a side facing the flange (35).

14. The in-wheel electric motor (4) according to claim 13, wherein an interconnecting duct (45D) is arranged between the coolant supply channel (45B, 45C, 45D) within the power electronics device and channels (38) within the cooling jacket (37).

15. The in-wheel electric motor according to claim 1, wherein the elongated connector member (33) comprises a flange (35) which lies within the cylindrical rotor body (60) and has a side (33-2) facing the power electronics device, wherein the flange (35) and/or inner circumferential surface of the cylindrical hollow stator body (31) is provided with one or more supports (91) which extend parallel to the axis of rotation and are adapted for supporting the sliding movement of the power electronics device along the axis of rotation into and out of the cylindrical hollow stator body (31).

16. A method for assembling an in-wheel electric motor (4); the in-wheel electric motor (4) comprising a stator (30) with at a vehicle side (2) an elongate connector member (33), a cylindrical hollow stator body (31) connected to the elongate connector member (33) with a central axis (R) and on an outer surface of the cylindrical hollow stator body (31) equipped with stator windings, and further comprising a cylindrical rotor body (60) coaxially enclosing the stator (30); the in-wheel electric motor (4) further comprising a power electronics device for powering the stator windings,
wherein the elongate connector member (33) comprises a first opening (92) of a feed channel for liquid coolant and a second opening (93) of a return channel opening for liquid coolant, each of the feed and return channels being substantially parallel to an axial direction (A) of the elongate connector member (33);
wherein the method comprises providing a housing (100) comprising control electronics, the housing (100) having an outgoing cooling channel with a first male connector and a return cooling channel, with a second male connector situated near the first male connector and sliding the first and second male connectors of the housing (100) into the first and second openings (92, 93).

17. Method according to claim 16, further comprising the steps of
providing within the in-wheel electric motor (4) an internal cooling circuitry (45A -45E) with a feed connector (102) and a return connector (103) for liquid coolant, with the feed connector (102) arranged for liquid tight coupling to the first opening (92) of the feed channel and the return connector (103) arranged for liquid tight coupling to the second opening (93) of the return channel, and connecting the power electronics device to the feed connector (102) and providing a coolant supply channel in the cooling circuitry (45A-45E) that extends from the feed connector (102) through first the power electronics device and subsequently to a cooling jacket (37) of the cylindrical hollow stator body (31) that is connected to the return connector (103).

\* \* \* \* \*